United States Patent

[11] 3,628,396

[72] Inventor Ben T. Grobowski
 Newark, Ohio
[21] Appl. No. 7,577
[22] Filed Feb. 2, 1970
[45] Patented Dec. 21, 1971
[73] Assignee A-T-O Inc.
 Cleveland, Ohio

[54] ADJUSTABLE STEERING ASSEMBLY
 5 Claims, 7 Drawing Figs.

[52] U.S. Cl. .................................................. 74/493,
 180/78, 280/87 A
[51] Int. Cl. ................................................ B62d 1/18
[50] Field of Search ....................................... 74/493,
 492; 180/78; 280/87 A

[56] References Cited
 UNITED STATES PATENTS
 804,375 11/1905 Buffum ..................... 74/493 X FOREIGN PATENTS
542,129 5/1922 France ........................ 180/78

*Primary Examiner*—Milton Kaufman
*Attorney*—Mahoney, Miller & Stebens

ABSTRACT: A low cost adjustable steering assembly comprising a pair of upstanding support plates to be fastened to the frame of the vehicle and between which the steering shaft is pivoted for forward and rearward adjustable swinging movement about a pivot and crankshaft also carried thereby. The crankshaft is connected by suitable linkage to the vehicle wheels to be steered. The crankshaft is turned by gears connecting the steering shaft and the crankshaft which are arranged to permit the swinging adjustment. The upstanding support plates have notched indexing portions on their upper ends, which cooperate with an indexing rod and bracket adjustably carried by the steering shaft and having biasing means for normally keeping the bracket in selective engagement with the notched indexing portions.

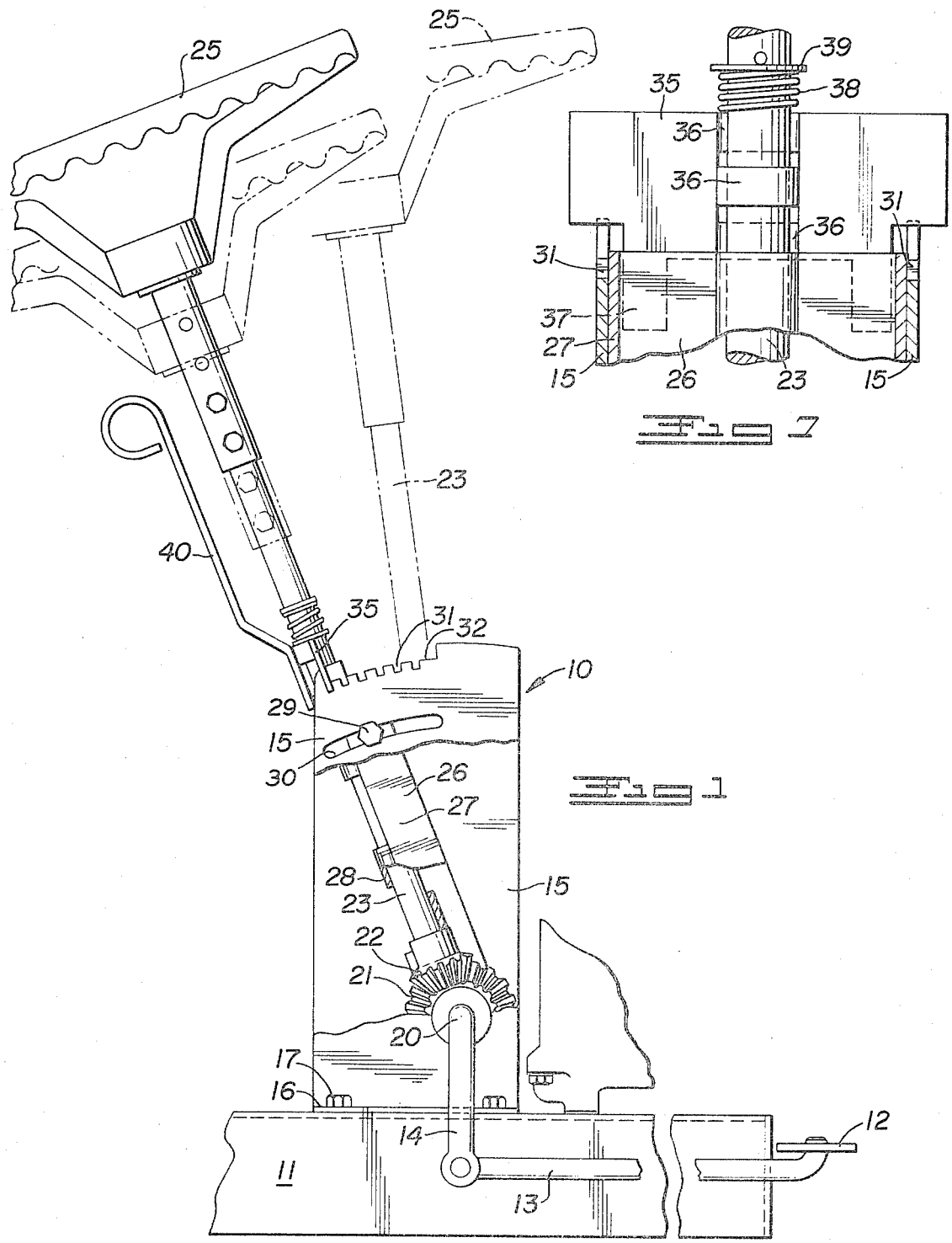

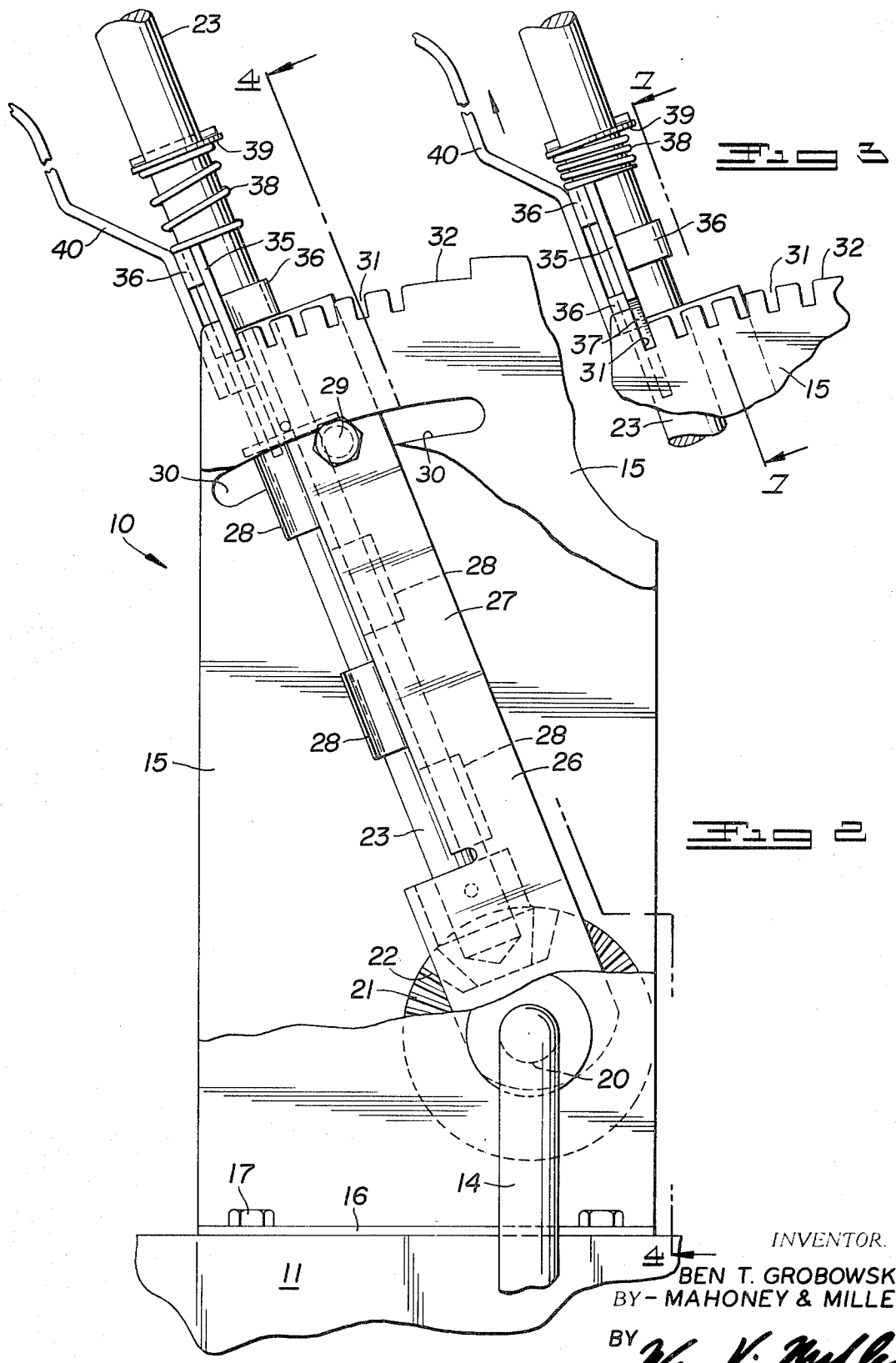

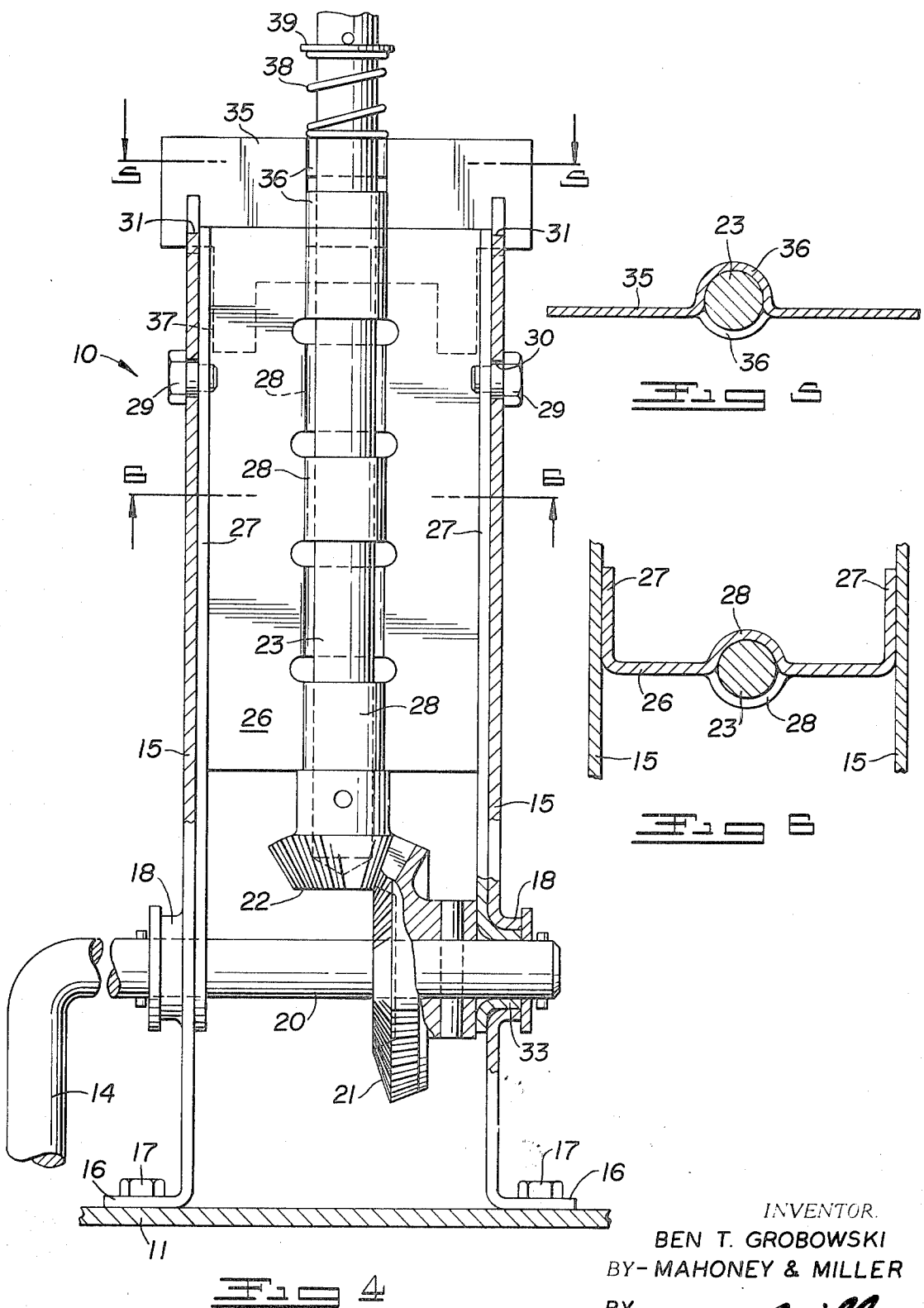

ADJUSTABLE STEERING ASSEMBLY

Very complicated and expensive adjustable steering assemblies have been provided for the relatively high-priced, high-speed vehicles, such as automobiles. My invention relates to an inexpensive adjustable steering assembly of such a nature that it is economic to use it on relatively low-cost vehicles such as riding mowers, garden tractors, etc. It can be fabricated by simple methods of low-cost materials and can be installed in the vehicle with ease. It will be extremely rugged and foolproof which is very important in connection with the type of vehicles with which it is designed to be used.

In the accompanying drawings, I have illustrated a preferred embodiment of my invention and in these drawings:

FIG. 1 is a side elevational view, partly broken away, of the entire assembly as it is installed on a vehicle frame.

FIG. 2 is an enlarged side elevational view, partly broken away, of the lower portion of the assembly of FIG. 1 and showing the indexing mechanism in engaged condition.

FIG. 3 is a similar view but showing mainly the indexing mechanism and indicating it in its released condition.

FIG. 4 is a vertical sectional view taken along line 4—4 of FIG. 2.

FIG. 5 is a horizontal sectional view taken along line 5—5 of FIG. 4.

FIG. 6 is a horizontal sectional view taken along line 6—6 of FIG. 4.

FIG. 7 is a vertical sectional view taken along line 7—7 of FIG. 3.

With reference to the drawings in detail, I have indicated in FIG. 1, my adjustable steering assembly 10 mounted on the frame 11 of a vehicle which will have the wheels to be steered (not shown). These wheels will be steered in the usual way by a bar 12 which is moved forwardly and rearwardly. This bar 12 is connected to the steering assembly by a connecting rod 13 which is connected to a crank arm 14 actuated by the novel steering assembly 10.

The steering assembly comprises a pair of upstanding support plates 15 which have flanges 16 at their lower ends adapted to be bolted by bolts 17 to the frame 11. The plates 15 will be supported on the vehicle frame in parallel planes extending longitudinally of the vehicle. Adjacent the lower ends of these plates 15, they are provided with aligned bearings 18 in which the crankshaft 20 is disposed for rotation. This shaft has the crank arm 14 formed integral therewith at one end thereof and disposed exteriorly of the associated plate 15. Directly within the other plate 15 on the shaft 20 and keyed thereto is a bevel gear 21. Turning this gear will rotate the shaft 20 and swing the crank arm 14 to steer the vehicle wheels.

The gear 21 is rotated by means of a bevel pinion 22 which engages therewith and is adapted to travel in mesh therewith around the center thereof. This pinion 22 is keyed on the lower end of the steering shaft 23. As shown in FIG. 1, this shaft will carry on its upper end, the steering wheel 25. It is desirable to provide a forward and rearward adjustment of this wheel 25 relative to the operator's position on the vehicle frame which may be a seat (not shown). This shaft is rotatably supported by a bracket 26 which is mounted for forward and rearward swinging between the support plates 15.

The bracket 26 is in the form of a plate of U-cross section having its vertical flanges 27 in sliding contact with the inner surfaces of the respective plates 15. Along the vertical centerline of the plate, it is provided at vertically spaced intervals with bearing loops 28 (FIG. 6) which are pressed outwardly on alternate sides of the plate so that they will receive and retain the shaft along the centerline of the plate for rotation. The flanges 27 carry outwardly projecting bolts or pins 29 which cooperate with arcuate slots 30 in the respective plates 15 that have their centers at the axis of the shaft 20. It will be noted that the upper edges of these plates are provided with sets of indexing notches 31, the notches on opposite plates being in alignment. It will also be noted that the upper edge portion 32 of each plate is arcuate. Each flange 27 of the bracket 26 is provided at its lower end with an integral outwardly extending boss or collar portion 33 which is rotatably disposed in the bearing portion 18 of the respective plate 15. Thus, the bracket 26 can be swung forwardly or rearwardly between the plates 15 about the axis of the shaft 20.

To hold the steering shaft supporting bracket 26 in a selected position to which it is swung, an indexing bracket is provided which is in the form of a plate 35 carried for axial vertical movement of the shaft 23 and extending transversely across the upper edges of the plates 15. The plate 35 is provided with oppositely pressed bearing loop portion 36 (FIG. 5) for receiving the plate for vertical sliding movement on the shaft 23. The plate is provided with a reduced width portion 37 (FIG. 7) adapted to extend down between the flanges 27 of the shaft support bracket 26. When it its lowermost position, the plate 35 will extend into a selected pair of aligned opposed indexing notches 31 in the plates 15. Normally the plate 35 is biased to its lower locking or retaining position (FIG. 2) by a compression spring 38 surrounding the shaft 23 and disposed between an upper axially fixed washer 39 on the shaft and the upper edge of the plate 35. For moving the plate 35 upwardly against the force of the spring 38, a pull rod 40 is secured to the plate 35, as by welding, and extends upwardly along the steering shaft 23 to an accessible point adjacent the steering wheel 25.

It will be apparent that normally the plate 35 will be biased by the spring 38 into an indexing position in a pair of the notches 31. To release the plate, it is merely necessary to pull up on the rod 40 to cause the plate to clear the notches and hold it in that position to permit forward or rearward swinging of the shaft support bracket 26. When the desired new position is reached, the rod 40 is released and the spring 38 will force the plate 35 into a newly selected pair of indexing notches 31. During forward or rearward swinging of the steering shaft 23, with the bracket 26, the pinion 22 will rotate about the axis of the shaft 23 and travel bodily around the gear 21 and at the same time the shaft 23 will rotate. However, when the shaft 23 is locked in its indexed position, it may be positively turned about its axis by the wheel 25 to rotate the pinion 22 which will drive the gear 21, turn the shaft 20, and swing the crank arm 14 forwardly or rearwardly to turn the vehicle wheels as desired.

It will be understood from the above that I have provided a simple, easily fabricated, easily installed low-cost steering assembly but which is very rugged and will be practically maintenance-free. Also, it can be released for easy adjustment and can be easily effectively locked in adjusted position.

I claim:

1. An adjustable steering assembly comprising a pair of upstanding support plates in laterally spaced parallel vertical planes, a steering shaft disposed between said plates and extending vertically thereof, a support bracket disposed between said plates for mounting said steering shaft for forward and rearward swinging movement between said plates and for rotation about its own axis, said support bracket supported for swinging movement about an axis adjacent its lower end and extending transversely between said support plates, indexing means for indexing the position of said steering shaft when it is swung forwardly or rearwardly relative to said plates and including a notched indexing portion at the upper edge of each plate, an indexing bracket carried by said steering shaft above said notched indexing portions and movable axially vertically on said shaft and biasing means normally urging said indexing bracket into locking engagement with said notched indexing portions, a transverse shaft supported for rotation coaxially with said support bracket and having a crank arm adapted to be connected to steering connections to be actuated, and interengaged gears keyed respectively to said steering shaft and to said transverse shaft whereby rotation of said steering shaft about its axis will rotate said transverse shaft about its axis and said steering shaft may be forwardly and rearwardly adjusted about the axis of said transverse shaft.

2. As assembly according to claim 1 in which said support bracket and support plates are connected by pin and arcuate slots on the respective members with the slots having their centers at the axis of the transverse shaft.

3. An assembly according to claim 2 in which the upper edges of said support plates are arcuate and have opposed sets of indexing notches which are in alignment, said indexing bracket comprising a transversely extending plate disposed on edge and extending over said support plates for engaging with selected pairs of the indexing notches, said indexing plate being provided with a bearing which slideably mounts it on said steering shaft for axial movement, and said biasing means comprising a compression spring engaging said plate and a fixed abutment on said shaft above said plate.

4. An assembly according to claim 1 wherein said support bracket is journaled on said support plates and includes bearings for supporting said transverse shaft for rotation.

5. An assembly according to claim 1 wherein said interengaged gears comprise a bevel pinion keyed on the lower end of said steering shaft and a bevel gear keyed on said transverse shaft.

* * * * *